United States Patent [19]

Bradshaw et al.

[11] 4,454,282

[45] Jun. 12, 1984

[54] WATER-BASED CHROMIUM DIOXIDE MAGNETIC RECORDING MEDIA

[75] Inventors: Richard L. Bradshaw; Samuel J. Falcone; Alexander Simonetti, all of Tucson, Ariz.

[73] Assignee: International Business Machines Corporation, Armonk, N.Y.

[21] Appl. No.: 477,196

[22] Filed: Mar. 21, 1983

[51] Int. Cl.[3] .................. B32B 5/16; C08L 75/04; C09D 11/00
[52] U.S. Cl. ......................... 524/407; 106/20; 106/37; 106/308 Q; 252/62.54; 427/47; 427/127; 427/128; 428/900; 524/591
[58] Field of Search .................. 524/407, 591; 252/62.54; 427/47, 127, 128; 428/900; 106/37, 20, 308 Q

[56] References Cited

U.S. PATENT DOCUMENTS

| | | | |
|---|---|---|---|
| 3,228,881 | 1/1966 | Thomas | 252/62.54 |
| 3,649,541 | 3/1972 | Ingersoll | 252/62.54 |
| 3,977,984 | 8/1976 | Roberts | 252/62.54 |
| 4,091,143 | 5/1978 | Hartmann et al. | 428/328 |
| 4,135,036 | 1/1979 | Mukaida et al. | 428/413 |
| 4,263,188 | 4/1981 | Hampton et al. | 252/62.54 |
| 4,275,114 | 6/1981 | Schoenafinger et al. | 427/127 |
| 4,283,438 | 8/1981 | Lee | 427/47 |
| 4,345,543 | 8/1982 | Pipkin | 118/106 |
| 4,352,859 | 10/1982 | Yoda et al. | 252/62.54 |
| 4,388,376 | 6/1983 | Kubota | 428/900 |

FOREIGN PATENT DOCUMENTS

| | | | |
|---|---|---|---|
| 974627 | 11/1964 | United Kingdom | 252/62.54 |
| 1029038 | 5/1966 | United Kingdom | 252/62.54 |
| 691921 | 10/1979 | U.S.S.R. | 252/62.54 |

*Primary Examiner*—Ronald W. Griffin
*Attorney, Agent, or Firm*—Francis A. Sirr

[57] ABSTRACT

A stable, non-agglomerating, magnetic recording coating ink, for use in coating a flexible non-magnetic substrate, is made by a two-step process which first mixes finely divided chromium dioxide particles with water and a polymeric surfactant/dispersant agent which has as its major functionality in a side chain, carboxylic acid, as a free acid, ester or amide thereof, and of a relatively low number average molecular weight in the range 500 to 20,000. Only after the particles are dispersed in this slurry is water-based polyurethane binder added to the slurry, as the second step in the process, to form the final ink.

11 Claims, No Drawings

WATER-BASED CHROMIUM DIOXIDE MAGNETIC RECORDING MEDIA

DESCRIPTION

1. Field of the Invention

This invention relates to the field of magnetic recording media, and more particularly to chromium dioxide, flexible substrate, media of the water-based type.

2. Background of the Invention

Magnetic recording media, having ferromagnetic chromium dioxide particles (hereinafter called chromium dioxide or $CrO_2$) as the magnetic pigment thereof, has long been recognized as desirable, due primarily to the high signal strength to be derived from chromium dioxide particles. U.S. Pat. No. 3,649,541 is typical of such a prior art teaching.

In addition, the art has recognized that water-based magnetic ink coating emulsions are desirable because harmful vapors are not given off to the environment during mixing, and/or drying of the coated substrate, as the magnetic recording media is manufactured.

U.S. Pat. No. 4,135,036 is exemplary of an attempt to provide a magnetic coating ink in the form of an aqueous emulsion, including a water-soluble or water-dispersible binder; that is, a ferromagnetic powder, a water-soluble or water-dispersible amide compound and an epoxy compound. It is stated that the ferromagnetic powder may be ferromagnetic chromium dioxide, and it is stated that dispersing agents (i.e., surfactants or dispersants) for the ferromagnetic powder may be added. The coating ink of this patent is formed by kneading and dispersing the composition, to form a water-soluble or water-dispersible binder type magnetic coating composition, which is then coated onto a non-magnetic support, and lastly dried.

In Comparative Example 2 of this patent, gamma iron oxide particles are first dispersed in water and casein (i.e. a phospho-protein consisting of about 15 amino acids, and having a molecular weight ranging from 75,000 to 375,000). Thereafter, an aqueous emulsion, containing a styrene-butadiene copolymer as a resin component, is added.

Examples 3 and 4 also teach a two-step mixing process. In these examples, cobalt-containing iron oxide (Example 3) and gamma iron oxide (Example 4) are first mixed with water and an amide compound which was prepared from carboxylic acid, dimer acid and triethylenetetramine. Thereafter, resins were added, to form the coating ink.

U.S. Pat. No. 4,263,188 deals with an aqueous magnetic ink, coating composition, said to be a stable aqueous dispersion of magnetic pigment (gamma $Fe_2O_3$) and polyurethane with carboxylic acid groups in the backbone chain (NeoRez EX-467). This ink includes wetting agents and dispersants, well known in the latex paint industry, such as a sodium salt of a carboxylate polyelectrolyte (Tamol 731), and an alkylaryl polyether alcohol nonionic surfactant (Triton CF-10). In this patent, no premixing of the magnetic pigment and the dispersant is suggested.

U.S. Pat. No. 4,091,143 is cited for its prior art teaching that dispersions containing chromium dioxide, in organic solvents, usually exhibit an undesirable increase in viscosity during processing, especially if left to stand for a prolonged period. This patent offers to solve this problem by adding to the organic solvent dispersion a zinc salt of an aliphatic carboxylic acid of 8 to 18 carbon atoms, of which the zinc salts of stearic acid, isostearic acid and especially oleic acid have proved to be suitable.

THE INVENTION

The present invention comprises an improved method of making a stable, non-agglomerating, magnetic ink, having chromium dioxide particles dispersed in a water-based polyurethane binder. Proper selection of the surfactant/dispersant used in this ink is critical to the ink's stability. By definition, a satisfactory coating ink is one which exhibits fine particle size, narrow particle size distribution throughout the ink, and is resistant to collapse (i.e., agglomeration) under the high shear environments used in the coating process.

A stable dispersion of chromium dioxide particles in an aqueous medium is achieved by the use of a low number average molecular weight polymeric dispersing agent containing an appreciable amount of carboxylic acid functionality in the polymer side chain.

An object of the present invention is to provide an aqueous dispersion mixture in which the chromium dioxide particles do not agglomerate, during initial mixing, during subsequent storage or during subsequent use in a media coating station.

A critical feature of this invention is that the chromium dioxide particles must first be wetted-out by a specific surfactant/dispersant agent, and only thereafter are the particles sheared in the presence of the water-based polyurethane binder.

More specifically, the aforesaid surfactant/dispersant polymer agent must have, as its major functionality in the side chain, carboxylic acid functionality, and preferably as the alkali metal salt thereof, and may in addition contain derivatives of carboxylic acids such as amides, esters, etc. The polymers thus formed furthermore must have a relatively low number average molecular weight ($M_n$), in the range of 500 to 20,000, and preferably between 2,000 and 10,000, as determined by gel permeation chromatography (GPC).

The compounds described in aforesaid U.S. Pat. No. 4,135,036 include amide-based compounds, which may contain small compounding materials such as acrylic acid, etc.

We have found that a truly effective dispersant must be of relatively low number average molecular weight, since even surfactant materials which those skilled in the art acknowledge to be good surfactants, fail to prevent agglomeration of chromium dioxide particles in a water-based polyurethane binder, if our critical molecular weight ($M_n$) range is not provided. We have found that it is the low molecular weight fraction of the surfactant which actually works to prevent agglomeration.

The generalized structure of such surfactant/dispersants is

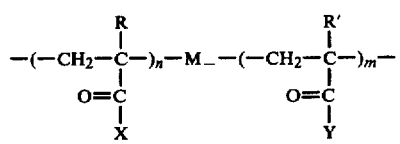

where:

| | |
|---|---|
| M = | Copolymer sequence not necessarily present |
| R = | H, CH$_3$, etc. |
| R' = | H, CH$_3$, etc., but not necessarily equal to R |
| n, m = | 1, 2, 3, ... etc, n ≠ m |
| X, Y = | OH, OR", NR$_3$, etc., but where X ≠ Y necessarily and where preferably X = O$^-$, Na$^+$, (—C(=O)—O$^-$Na$^+$) |

Copolymer (m), containing other functionality, may also be incorporated into the polymer chain so long as sufficient carboxylic acid salt functionality is also present to permit the compound to function as a dispersant for the chromium dioxide particles.

High molecular weight ($10^6$ to $10^5$) polymers, containing similar functionality, have been found to produce poor-quality dispersing of chromium dioxide in an aqueous medium, and often produce severe agglomeration under high shear. It has also been found that free amine (primary, secondary or tertiary) present in the polymer side chain, leads to severe and rapid agglomeration of the chromium dioxide particles.

The primary problem in preparing a chromium dioxide particle, water-based magnetic coating ink, is in obtaining a consistent, stable dispersion of the particles in water. In order for the ink to be a stable particle dispersion, there must be a tenacious interaction between the dispersing agent and the particles.

We have found that the brand BYK-VP-155 polyacrylate dispersant, by Mallinckrodt Chemical Works, is such a dispersant. The molecule of this commercial product is the sodium salt of an acrylic acid-acrylic ester copolymer, with a number average molecular weight of about 2,000. VP-155 is sold for use as a nonfoaming anionic dispersant for latex systems, having a pH value of from 5 to 7, for use in recommended amounts of from 0.3 to 1.5%, based upon the total latex formulation being 100%.

When, in accordance with the present invention, a dispersion of chromium dioxide particles, water and BYK-VP-155 is mixed with an aqueous polyurethane binder, such as the brand NeoRez R-960, by Polyvinyl Chemical Industries, the ink is sufficiently stable that during the coating of a flexible substrate, such as 0.0005 to 0.003 inch thick Mylar brand polyester film by E. I. DuPont de Nemours & Co., the ink can be recirculated through a 2-micron filter for long periods of time without plugging the filter, or destroying the coating properties of the ink.

Other aqueous polyester polyurethane binders which we find useful are brand WITCOBOND by Witco Chemical Co., Inc., and brand SPENSOL L54 by Spenser Kellogg division of Textrom, Inc.

A particularly good coating apparatus to be used to coat the ink of the present invention is that disclosed in U.S. Pat. No. 4,345,543, incorporated herein by reference.

As proof of the fact that the number average molecular weight of the surfactant/dispersant is critical to the present invention, and must be relatively low, we have observed that a 50/50 copolymer of methacrylic acid and acrylamide of $M_n$ 50,000, when added to a dispersion of chromium dioxide particles in water, produced rapid agglomeration of the particles such that no size distribution could be measured with a Nano-Sizer (a submicron particle size analyzer by Coulter Electronics Corporation). However, when the same copolymer, of a low $M_n$ of 4000 was used, a significant reduction in particle size, and an improvement in stability of the dispersion was measured with the Nano-Sizer.

Also in this vein, a dispersant of $M_n$ 2000 of the brand Agesperse 71 by CPS Chemical Company, which is a polymeric acrylic acid sodium salt, is a good dispersant to be used in the practice of the present invention. Agesperse 71 is sold for use as a pigment dispersant for water-based paints, and it is identified by its manufacturer as an anionic carboxylate polymer, i.e. sodium salt of polymeric carboxylic acid, made of 75 wt. % water and 25 wt. % solids, and of a pH range 9.5 to 10.5.

While not critical to the present invention, it is suggested that the following method is useful in ascertaining the ability of a dispersant to adequately function with chromium dioxide particles in water. This method subjects a liquid mixture of the dispersant and the $CrO_2$ magnetic oxide particles to two very different levels of mechanical mixing. The resultant particle size analysis enables one to classify the ability of the dispersant to function with $CrO_2$. That is, the more similar the two particle size analysis results, the better is the dispersant.

In the practice of this method, the $CrO_2$ particles usually in an amount of about 0.01 grams/cc, are first mixed in water. The proportions of the mixture are such that the mixture will transmit light, since the particle analysis equipment to be subsequently used depends upon light transmission for its operation. The dispersant being evaluated is then added to this mixture. For example, one drop of a 1% to 10% solution of the dispersant, for each 1 to 2 cc's of the solution.

This mixture is then hand-shaken to produce what appears to be adequate mixing. The sample is then placed in the sample compartment of a light scattering, submicron particle size analyzer such as the Coulter Nano-Sizer. The particle size of the mixture is then immediately analyzed at about 15-second intervals with the instrument operating in the auto mode for a minimum of two minutes. The results are recorded as a plot depicting the rate of flocculation. The mixture is then subjected to much more vigorous mixing by placing the mixture in an ultrasonic bath for about 10 to 20 seconds. The particle size of the mixture is again immediately measured, and a second rate of flocculation is plotted.

The desired property of a good dispersant is that minimal mechanical work be required to obtain particle dispersion throughout the liquid, and that the dispersed particles not reflocculate. For the data plots generated by the above method, the plot of these curves should not appreciably change with time. Also, the plot obtained by gentle handshaking, as compared to mixing with an ultrasonic bath, should produce about the same overall particle sizes. In addition, these tests must exhibit acceptable repeatability.

It is known that chromium dioxide particles display reactivity toward water and certain easily oxidizable functional groups, such as for instance hydroxyl or amine groups. These functional groups are often present in the resins used in the formulations for magnetic tapes. Numerous vendors of these particles sell products which have been stabilized in order to render the particles resistant to this reductive degradation. We prefer to use such stabilized particles in the practice of the present invention.

Chromium dioxide is a black, magnetic powder, of needle-like particles typically less than one micron in length, and less than 0.1 micron in width. Its bulk density is about 60 pounds per cubic foot. Its specific gravity is about 4.85, such that without special compaction, it is about 80% air, by volume. This material is commercially available from E. I. DuPont de Nemours & Co.

The following comparative examples I and II, of number average molecular weights $10^6$ and 100, respectively, are concerned with the use of surfactant/dispersant agents outside our critical range of about 500 to 20,000. When these aqueous, chromiumdioxide-containing mixtures were tested, using the Nano-Sizer as aforesaid, poor-quality dispersion of the chromium dioxide was observed.

Examples I, II, III and IV, involve surfactant/dispersant agents of number average molecular weights in accordance with our invention, and of 1,000, 2,000, 4,000 and 27,000, respectively. Similar Nano-Sizer testing provided a basis for establishing the critical surfactant/dispersant number average molecular weight range of about 500 to 20,000 to be operable in our invention.

COMPARATIVE EXAMPLE I

A small amount of high number average molecular weight (about $10^6$) polyacrylic acid sodium salt was added to a dispersion of chromium dioxide particles in water. The mixture was then subjected to two different levels of mechanical mixing, followed by analysis using the Nano-Sizer, as aforesaid. No detectable change in particle size was detected. Only a slight improvement in polydispersity was detected, and the stability of particle dispersion actually decreased.

COMPARATIVE EXAMPLE II

A small amount of low number average molecular weight (about 100) monomeric acrylic acid was added to a dispersion of chromium dioxide particles in water, and tested as in Comparative Example I. Rapid agglomeration of the chromium dioxide particles occurred, such that no particle size distribution could be measured; i.e., the agglomerate particles were too large for the instrument to measure.

EXAMPLE I

A small amount of co-poly (maleic acid-monoester polyethylene glycol 200) and a 50/50 polymer (acrylamide), of a number average molecular weight about 1,000 (sometimes called a half PEG200 ester of maleic acid and acrylamide), was added to an ultrasonically dispersed mixture of chromium dioxide particles in distilled water. Nano-Sizer testing, as in the manner of Comparative Example I, showed that the particle size was reduced from 1.1–1.3 microns to 0.4–0.6 microns, with improvement in polydispersity and mixture stability. From this test, it was concluded that similar improvement would be observed for a surfactant/dispersant of a number average molecular weight as low as 500.

EXAMPLE II

A small amount of Agesperse 71 brand, of a weight average molecular weight about 2,000, was added to a mixture of the type defined in Example I, and then subjected to Nano-Sizer analysis as aforesaid. A reduction in particle size from 1.1–1.3 microns to 0.4–0.6 microns was observed, with considerable improvement in polydispersity and mixture stability.

EXAMPLE III

A small amount of a copolymer (50/50) of methacrylic acid and acrylamide, of a number average molecular weight about 4,000, was added to a water and chromium dioxide particle mixture, as above recited, and then subjected to Nano-Sizer analysis. A significant reduction in particle size, and improved mixture stability was observed.

EXAMPLE IV

A small amount of the sodium salt of polymethacrylic, of a number average molecular weight about 27,000, was added to a water/chromium dioxide particle mixture, and analyzed using the Nano-Sizer, as aforesaid. A slight reduction in particle size and mixture stability was observed. As a result, it was concluded that the upper end of the number average molecular weight was about 20,000.

In all instances, chromium dioxide particles were subjected to the influence of a polymeric surfactant/dispersant agent, of a number average molecular weight in the range about 500 to 20,000, and only thereafter were the particles mixed or sheared in the presence of a water-based polyurethane, to form a coating ink, the resulting ink exhibited good particle dispersion and stability.

In accordance with the present invention, a coating ink comprises chromium dioxide particles in the wt. percent range 15 to 30; water-based polyester polyurethane binder (the brands NeoRez R-960, WITCOBOND or SPENSOL L54, for example) in the wt. percent 15 to 25; the dispersant, as defined herein (the brands BYK-VP-155, Agesperse 71, for example), in the wt. percent 0.2 to 3; a crosslinker in the wt. percent 0.2 to 3; and water in the wt. percent 40 to 60.

As a crosslinker, we prefer the brands CYMEL 303 (American Cyanamid Co.), CX-100 (Polyvinyl Chemicals, Incorporated), or XAMA-2, a polyaziridine (Cordova Chemical Company).

A preferred ink formulation comprises 23.62 wt. % chromium dioxide, 0.44 wt. % dispersant, 21.65 wt. % binder, 0.65 wt. % crosslinker and 53.64 wt. % deionized water. More specifically comprising chromium dioxide particles, BYK-VP-155 dispersant, SPENSOL L54 binder and XAMA-2 crosslinker.

In all cases, in accordance with our invention, the chromium dioxide particles are mixed with the dispersant, usually with some water, prior to being mixed or sheared with the binder, the crosslinker and the remaining water.

While the invention has been particularly shown and described with reference to preferred embodiments thereof, it will be understood by those skilled in the art that various changes in form and details may be made therein without departing from the spirit and scope of the invention.

What is claimed is:

1. A method of making a stable, non-agglomerating, magnetic recording coating ink, which is free of organic solvents, for use in coating a flexible nonmagnetic substrate, said ink having ferromagnetic chromium dioxide particles dispersed in a water-based polyurethane binder, the method comprising the ordered steps of:

first dispersing said particles in water and a polymeric surfactant/dispersant agent which has carboxylic acid, as its major functionality in a side chain, as a free acid, sodium salt, ester or amide thereof, and having a number average molecular weight in the range of about 500 to 20,000, to thereby form a slurry; and only thereafter adding said water-based polyurethane binder to said slurry of prior-dispersed particles.

2. The method of claim 1 wherein said number average molecular weight is in the range 2,000 to 10,000.

3. The method of claim 2 wherein said agent's carboxylic acid functionality is provided as the alkali metal salt of carboxylic acid.

4. The method of claim 2 wherein said agent is a half PEG200 ester of maleic acid and acrylamide having a number average molecular weight of about 1,000.

5. The method of claim 2 wherein said agent is a polymeric acrylic acid sodium salt having a number average molecular weight of about 2000.

6. The method of claim 2 wherein said agent is a 50/50 copolymer of methacrylic acid and acrylamide, having a number average molecular weight of about 4000.

7. The method of claim 3 including the step of thereafter adding a crosslinking agent.

8. The method of claim 6 wherein the ink comprises the weight percentage ranges chromium dioxide 15 to 30; binder 15 to 25; surfactant/dispersant agent 0.2 to 3; crosslinker 0.2 to 3; and water 40 to 60.

9. The method of claim 7 wherein the ink comprises the weight percentages chromium dioxide about 23; binder about 22; surfactant/dispersant agent 0.5; crosslinker 1; the remainder being water.

10. The method of claim 8 wherein said binder is a polyester polyurethane.

11. The method of claim 9 wherein said binder is a polyester polyurethane.

* * * * *